United States Patent [19]

Ainoya et al.

[11] 4,053,741

[45] Oct. 11, 1977

[54] SYSTEM FOR CYCLIC OPERATION OF SELF-RUNNING OBJECTS

[75] Inventors: Koh Ainoya; Nobuyuki Koyama, both of Tokyo, Japan

[73] Assignee: The Japan Tobacco and Salt Public Corporation, Tokyo, Japan

[21] Appl. No.: 609,169

[22] Filed: Aug. 29, 1975

[30] Foreign Application Priority Data

Aug. 30, 1974 Japan .................................. 49-98907

[51] Int. Cl.² .......................... A24C 5/35; G06F 15/46; B65G 47/00

[52] U.S. Cl. ................................. 364/478; 131/21 R; 131/25; 198/349; 198/347; 198/358; 214/1 B

[58] Field of Search ................ 235/151, 151.1, 151.11; 340/172.5; 444/1; 198/19, 20 C, 20 R, 38, 40, 42; 214/1 B, 1 BB, 1 N, 11 R, 16 R, 16 B, 16.1 R, 16.1 BA; 29/33 P, 563, 430; 131/21 R, 25; 104/88

[56] References Cited

U.S. PATENT DOCUMENTS

| | | | |
|---|---|---|---|
| 3,576,540 | 4/1971 | Fair et al. ........................... | 340/172.5 |
| 3,726,383 | 4/1973 | Bornfleth et al. .................. | 198/38 X |
| 3,796,327 | 3/1974 | Meyer et al. ....................... | 198/19 X |
| 3,854,889 | 12/1974 | Lemelson ........................... | 198/19 X |

*Primary Examiner*—Joseph F. Ruggiero
*Attorney, Agent, or Firm*—Armstrong, Nikaido & Marmelstein

[57] ABSTRACT

A system for the cyclic operation of self-running objects in a circular network of guide means including at least two working stages, each having a plurality of working zones. The individual working zone of one stage differs in working capacities from the respective working zone of the succeeding stage, which comprises feeding of the self-running objects one after another along the guide means to the respective working zones according to requests for the objects from the respective working zones and pooling of the objects after completion of working operations at the respective working zones for further feeding of the objects to a succeeding working stage. With this system, a plurality of working stages can be systematically connected to carry out the working operations effectively and successively, eliminating waste and redundancy in time and working equipment.

10 Claims, 15 Drawing Figures

SYSTEM FOR CYCLIC OPERATION OF SELF-RUNNING OBJECTS

BACKGROUND OF THE INVENTION

1. Field of the Invention

This invention relates to a system for the cyclic operation of self-running objects in a circular network of guide means and more particularly to a system for the cyclic operation of self-running objects in a circular network of guide means including at least two working stages, each having a plurality of working zones. The individual working zone of one stage differs in working capacities from the respective working zone of the succeeding stage. The system pools of the objects between the respective adjacent two stages to store the objects for supplying them without delay to the respective working zones upon request from the respective working zones for successively carrying out working operations at the respective zones in any working stage.

2. Description of the Prior Art

For example, it is necessary, in a manufacturing factory, to transport materials to be processed from one stage of the manufacturing process to another stage thereof. Generally, one quantity of materials determined to be a carrying unit of a transporting vehicle are loaded on the transporting vehicle at one stage and transported to another stage where the materials are unloaded or the vehicle loaded with the materials is moved from one stage to another for processing the materials sequentially at the respective stages. Alternatively, working machines are transported from one station to another station to process materials disposed at the respective stations. In such a manufacturing facility, a plurality of working machines of the same kind or materials to be processed of the same kind are arranged in each stage of the process or station of the materials and a plurality of transporting devices are employed to connect the stages or stations with one another. In this connection, it is to be noted that there is no need to dispose the transporting devices for the connections only between the corresponding machines or materials so long as the sequence of the manufacturing process can be maintained and it is not advantageous to specify the relation between the transporting devices and the machines, especially when the capacity of the individual machine is different between the working stages to be connected.

SUMMARY OF THE INVENTION

It is an object of the present invention to provide a system for operating self-running objects in a layout where a plurality of working machines of the same kind are arranged in parallel with one another, which is capable of feeding the self-running objects pooled in a reservation zone one after another to the respective working machines upon requests from the respective working machines.

It is another object of the present invention to provide a system for operating self-running objects in a layout where a plurality of working stages are arranged according to the sequence of the working process and a plurality of working machines of the same kind are arranged in parallel with one another in the respective stages, which is capable of feeding the self-running objects pooled at a reservation zone, one after another to the respective working machines of the first stage upon requests from the respective machines, pooling the self-running objects after the completion of the first stage working operations at another reservation zone to store the objects for the succeeding working stage, feeding the self-running objects pooled at said another reservation zone, one after another to the respective working machines of the second stage upon requests from the respective machines, and pooling the self-running objects after completion of the second stage working operations at a further reservation zone to store the objects for the succeeding working stage, thus effecting further analogous operations according to the number of the working stages.

It is a further object of the present invention to provide the system for a cyclic operation of self-running objects, which is capable of returning the self-running objects after completion of the final working stage to the first reservation zone for further repetition of the operation of the self-running objects.

It is a still further object of the present invention to provide a system for the operation of self-running objects which is capable of additionally storing the self-running objects just before the respective working machines thereby to supply the objects, without delay, to the respective working machines substantially upon completion of the working operation of the respective preceeding self-running objects.

It is a still further object of the present invention to provide a system for the operation of self-running objects, which is capable of feeding the objects in order of their arrival to the reservation zone.

It is a still further object of the present invention to provide a system for the cyclic operation of self-running objects, which is capable of recharging a driving source during the cyclic operation of the self-running objects in the system.

According to the present invention, there is provided a system for the cyclic operation of self-running objects in a circular network of guide means including at least two working stages, each having a plurality of working zones, the individual working zone of one stage differing in working capacities from the respective working zone of the succeeding stage. The operation comprises feeding the self-running objects one after another along the guide means to the respective working zones of the first stage upon requests for the objects from the respective first stage working zones; effecting working operations in association with the objects fed at the respective first working zones; pooling the objects after completion of the working operations at the respective first stage working zones, feeding the objects pooled, one after another, along the guide means to the respective working zones of the second stage in response to requests for the objects from the respective second stage working zones; effecting working operations in association with the objects fed at the respective second stage working zones; and pooling the objects after completion of the working operation at the respective second stage working zones for further feeding of the objects to the working zones of the first stage.

BRIEF DESCRIPTION OF THE DRAWINGS

The present invention will be better understood from the following description taken in connection with the accompanying drawings, in which.

DETAILED DESCRIPTION OF THE PREFERRED EMBODIMENT

Figure 1:
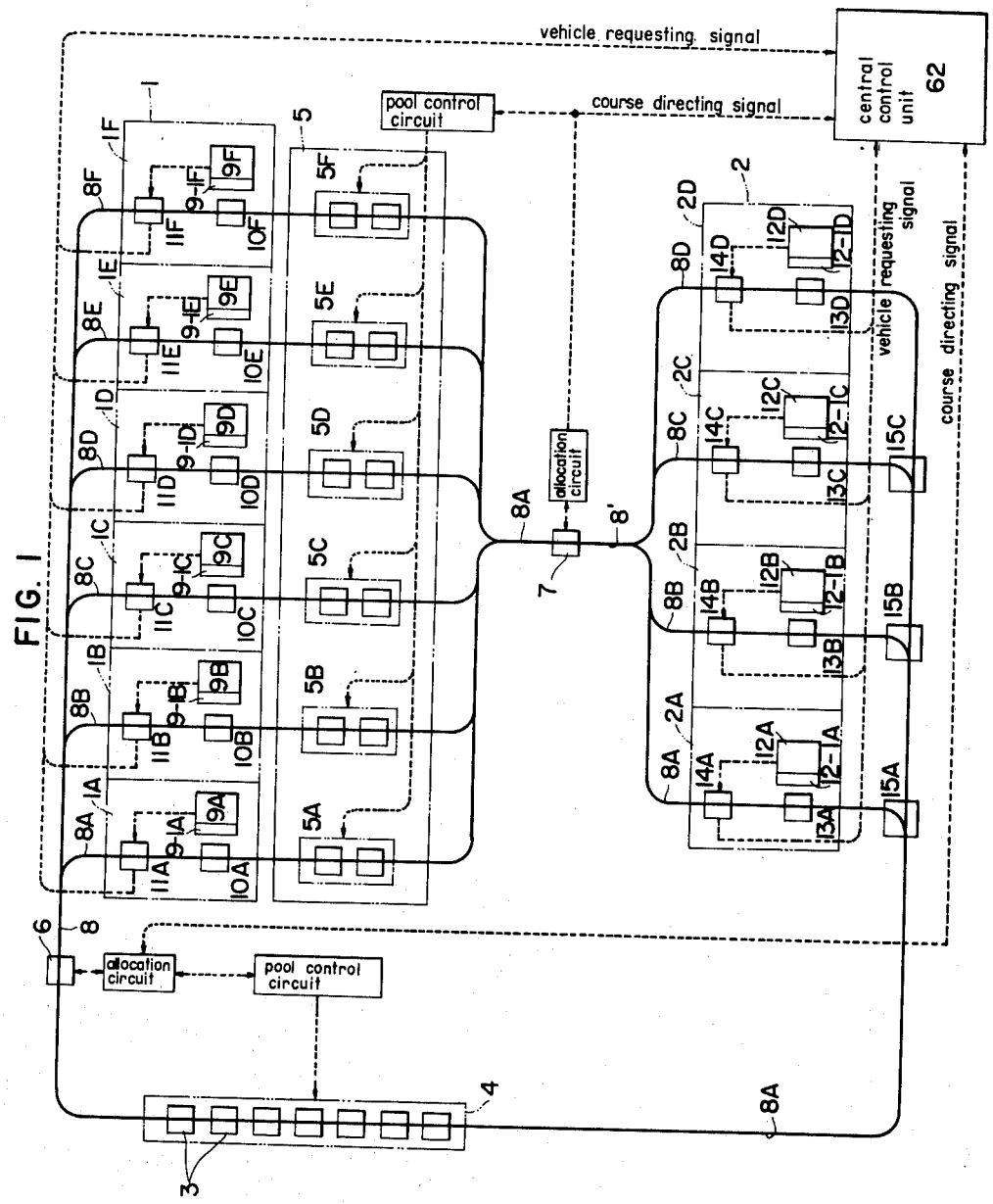
FIG. 1 is a network diagram for a system for the cyclic operation of self-running objects according to the present invention.

Referring now to the drawings, there is illustrated one preferred embodiment of the present invention in connection with a product process of a cigarette manufacturing factory.

FIG. 1 shows two working stages or processes, namely, cigarette manufacturing process 1 having a plurality of cigarette manufacturing machines and a packing process 2 having a plurality of packing machines for packing cigarettes, manufactured in the manufacturing process 1, into small packages.

There are provided reservation zones between the two processes, more particularly, a reservation zone 4 for self-running objects or vehicles carrying empty trays thereon (hereinafter referred to as "empty vehicles")is located between the packing process 2 and the cigarette manufacturing process 1 and a reservation zone 5 for self-running vehicle carrying cigarrette-loaded trays thereon (hereinafter referred to as "loaded vehicle") is located the cigarette manufacturing process 1 and the packing process 2. There two processes 1 and 2 and reservation zones 4 and 5 are connectd with each other by a guide line 8 buried in or laid out on the floor of the factory.

More particularly, self-running vehicles 3 carrying empty trays start from the reservation zone 4 and reach the cigarette manufacturing process 1. The vehicles are loaded with cigarettes from the cigarette manufacturing machines and are then advanced to the reservation zone 5 to stand by there for further transporation to the succeeding process. The vehicles 3, then, enter the packing process 2, where the cigarette-loaded trays are unloaded onto the packing machines and the empty trays are received from the packing machines and returned to the reservation zone 4 to stand by for further transportation.

Thus, the cigarette manufacturing process 1 and the packing process 2 are connected by the self-running vehicles 3 and the reservation zones for storing the vehicles in stand status are provided after and before the two processes to establish a circulatory or cyclic transportation system, connecting the two processes.

Stated illustratively, there are six cigarette manufacturing zones 1A, 1B, 1C, 1D, 1E and 1F (similarly hereinafter alphabetical suffixes are used for identification between same kind of matters) in the cigarette manufacturing process 1. In each of the cigarette manufacturing zones 1A to 1F, a cigarette manufacturing machine 9A to 9F is installed, respectively. The machines 9A to 9F each have load-unload devices 9-1A to 9-1F, respectively, which are adapted to automatically receive the vehicle 3 and automatically start the vehicle 3 after completion of the load-unload work. In each of the zones 1A to 1F, there is provided a working station 10A to 10F, respectively, for the vehicle 3 to undergo, there the load-unload work in connection with the respective machine 9A to 9F and there is further provided a stand-by station 11A to 11F, in the respective zone 1A to 1F at a position immediately before the respective working zone, for reserving there at least one vehicle 3 for the respective machines 9A to 9F.

Loop guide lines 8A to 8F divide from the collective guide line 8 and are laid out on the floor so as to pass through the zones 1A to 1F, respectively. The loop guide ines 8A to 8F are connected, at the exit portions of the respective zones 1A to 1F to a common guide line which extends to an allocation zone for the loaded vehicle 3 through the reservation zone 5. For the common guide line, one of the loop guide lines 8A to 8F more particularly 8-1A to 8-1B, is advantageously employed. In the present embodiment, the loop guide line 8A is used for the common guide line.

In the packing process 2, there are provided four packing zones 2A to 2D each of which is provided with a packing machine 12A to 12D, respectively. In this connection, it is to be noted that there is a difference in capacities between the individual cigarette manufacturing machine 9A to 9F of the process 1 and the respective packing machine 12A to 12D of the process 2, but it is preferable that the total capacity of the cigarette manufacturing machines 9A to 9F are substantially balanced with the total capacity of the packing machines 12A to 12D. In an analogous way with the cigarette manufacturing process 1, the packing machines 12A to 12D each have load-unload devices 12-1A to 12-1D, respectively, which are adapted to automatically receive and start the vehicle 3. In each of the zones 2A to 2D, there is provided a working station 13A to 13D, respectively for the vehicle 3 to load and unload in connection with the respective packing machine 12A to 12D and there is further provided a stand-by station 14A to 14D, at a position immediately before the working station, for holding at least one vehicle 3 for the respective packing machine 12A to 12D.

Loop guide lines 8A to 8D which divide from a collective guide line 8' and which are connected to the guide line 8A at the allocation zone 7 are laid out on the floor so as to pass through the respective packing zones 2A to 2D. These guide lines 8A to 8D are further connected to a common line for example the guide line 8A between the exit portions of the respective packing zones 2A to 2D and another allocation zone 6 for the empty vehicles 3 through intersection control devices 15A to 15C and the reservation zone 4 for the empty vehicles 3. The common line may be any one of the guide lines 8A to 8D more particularly 8-2A to 8-2D.

Figure 2:
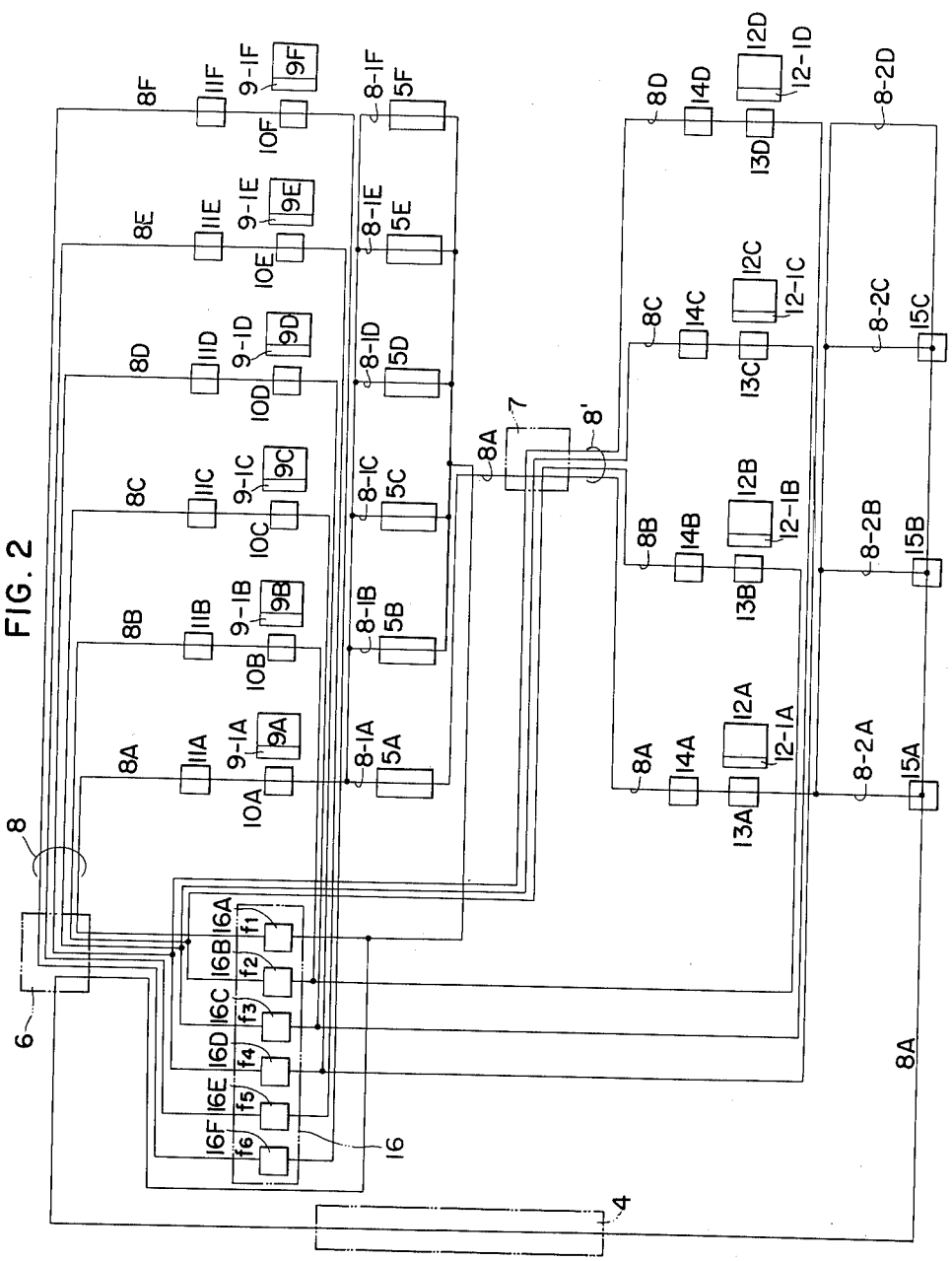
FIG. 2 is a network diagram of guide lines layed out for the system.

FIG. 2 shows the layout of the guide lines including the collective guide lines 8 and 8', the loop guide lines 8A to 8F and the common guide line 8A.

In the cigarette manufacturing process 1, the six loop guide lines 8A to 8F are disposed to form the collective guide line 8 and are laid out so as to form loops. The guide line 8H to 8F are oscillators 16A to 16F, respectively, to generate magnetic field corresponding to frequencies f1 to f6 peculiar to the respective guide lines 8A to 8F.

Similarly, in the packing process 2, the collective guide line 8' is an aggregation of the four loop guide lines 8A to 8D which are provided correspondingly to the respective packing zones 2A to 2D so as to form loops. The guide lines 8A to 8D are connected to the oscillators 16A to 16D, respectively, to generate magnetic fields corresponding to frequencies f1 to f4 peculiar to the respective guide lines 8A to 8D.

In either of the two processes 1 and 2, the loop guide line 8A is used for the common guide line from the exits of the respective zones 1A to 1F and 2A to 2D to the allocation zones 6 and 7 through the reservation zones 4 and 5 respectively.

Figure 3:
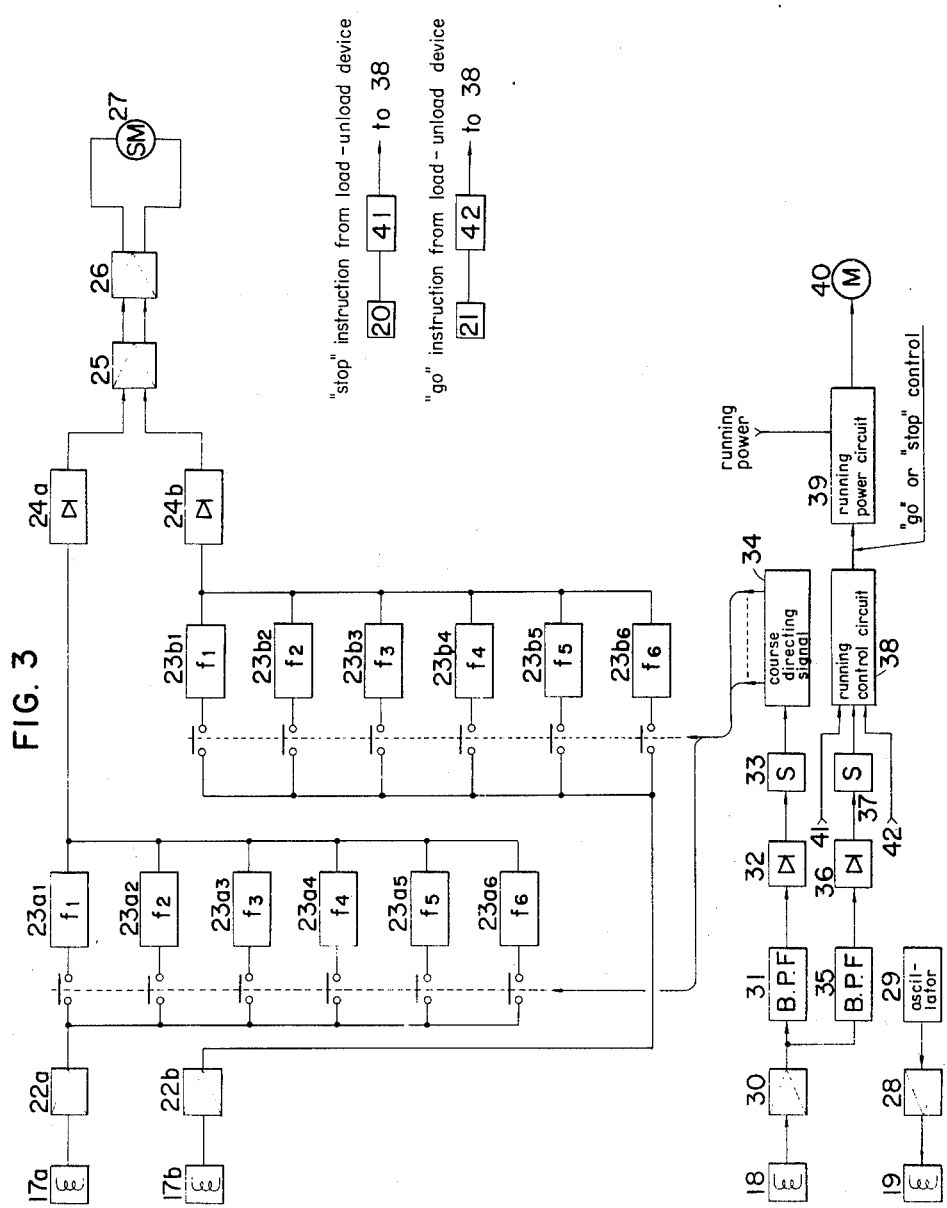
FIG. 3 is the block diagram showing a wiring for controlling the self-running objects.

The vehicle 3, adapted to run on the guide lines is equipped with a driving source such as a battery and a control circuit as shown in FIG. 3. Stated illustratively, the vehicle 3 has steering coils, or guide line detecting coils 17a and 17b which are mounted on the vehicle 3 at positions so as to straddle any one of the guide lines selected and the coils are adapted to detect the magnetic field generated from the guide line which is selected. The vehicle 3 further has a receiving coil 18 and a transmission coil 19 for receiving and transmitting signals from and to ground control equipment installed at the allocation zones 6 and 7, the intersection, etc., respectively. The vehicle also includes switch means 20 and 21 such as reed switches or other electronic switch means adapted to cooperate with controlling means on the load-unload devices 9-1A to 9-1F of the cigarette manufacturing machines 9A to 9F and the load-unload devices 12-1A to 12-1D of the packing machines 12A to 12D to receive a "stop" and a "go" signal, respectively.

The guide line detecting coils 17a and 17b are connected to a difference amplifier 25 through band-pass filters $23a_1$ to $23a_6$ and $23b_1$ to $23b_6$, and rectifier circuits 24a and 24b connected in parallel with each other. Said difference amplifier 25 is further connected to a servomotor 27 for steering the vehicles, through a power amplifier 26.

The band-pass filters $23a_1$ to $23a_6$ and $23b_1$ to $23b_6$ are adapted to produce an output upon detection of any one of the frequencies f1 to f6 selected to detect the corresponding guide line in the collective guide lines 8 and 8'. The selection and setting of the band-pass filters $23a_1$ to $23a_6$ and $23b_1$ to $23b_6$ are effected upon closing of an input contact of a selected filter circuit by a control signal from a course direction circuit 34 as mentioned in detail later.

When the guide line detecting coils 17and 17b are kept equally distanced from the guide line selected, straddling it, there is no difference in output between the rectifier circuits 24a and 24b and thus there is no output from the difference amplifier 25 so that the servomotor 27 is not operated.

When the distances from the coils 17a and 17b to the guide line differ from each other, the output from either one of the coils 17a and 17b which is positioned nearer to the guide line becomes larger than that of the other which is positioned farther from the guide line, causing difference in outputs between the rectifier circuits 24a and 24b. The difference amplifier 25 is then operated to rotate the servomotor 27 clockwise or counterclockwise, after amplification by the power amplifier 26, so as to equalize the distances from the coils 17a and 17b to the guide line or to make the difference in outputs between the rectifier circuits 24a and 24b zero. Upon the clockwise or counterclockwise rotation of the servomotor 27, the direction of a front wheel connected to said servomotor 27 is controlled and the vehicle 3 can constantly run along the guide line.

The transmission coil 19 is connected to an oscillator 29 through a transmission amplifier 28. On the other hand, the receiving coil 18 is connected to band-pass filters 31 and 35 through a receiving amplifier 30. The band-pass filter 31 is adapted to detect a frequency fx (fx is one of the frequencies f1 to f6 which has been selected) as a course direction signal and apply the signal to the course direction circuit 34 through a rectifier circuit 32 and a Schmidt circuit 33. The output from said course direction circuit 34, namely, the course direction signal, is applied to corresponding one filter circuit of each of the band-pass filters $23a_1$ to $23a_6$ and $23b_6$ to operate them in response thereto.

The band-pass filter 35 is adapted to detect a stop signal of a frequency fx' transmitted from ground equipment as mentioned in detail later. The output from the band-pass filter 35 is applied to a running power circuit 39 through a rectifier circuit 36 and a Schmidt circuit 37 to stop a driving motor 40.

The switch means 20 is adapted to operate in response to a magnetic substance 44 mounted on each of the load-unload devices 9-1A to 9-1F of the cigarette manufacturing machines 9A to 9F and the load-unload devices 12-1A to 12-1D of the packing machines 12A to 12D and the output is applied to a running control circuit 38 through a Schmidt circuit 41 to stop the driving motor 40.

Similarly, the switch means 21 is adapted to operate by a transmission coil 43 mounted on the load-unload devices 9-1A to 9-1F and 12-1A to 12-1D and the output is applied to the running control circuit 38 through a Schmidt circuit 42 to operate the running power circuit 39 and start the rotation of the driving motor 40. The transmission coil 43 is also adapted to transmit a signal having a frequency same as the common guide line, at the starting of the vehicle 3 from the respective load-unload devices 9-1A to 9-1F and 12-1A to 12-1D and the signal is applied to the course direction circuit 34 to set the band-pass filters, corresponding to the frequency of the signal, so that the vehicle 3 may travel on the common guide line.

Figure 4:
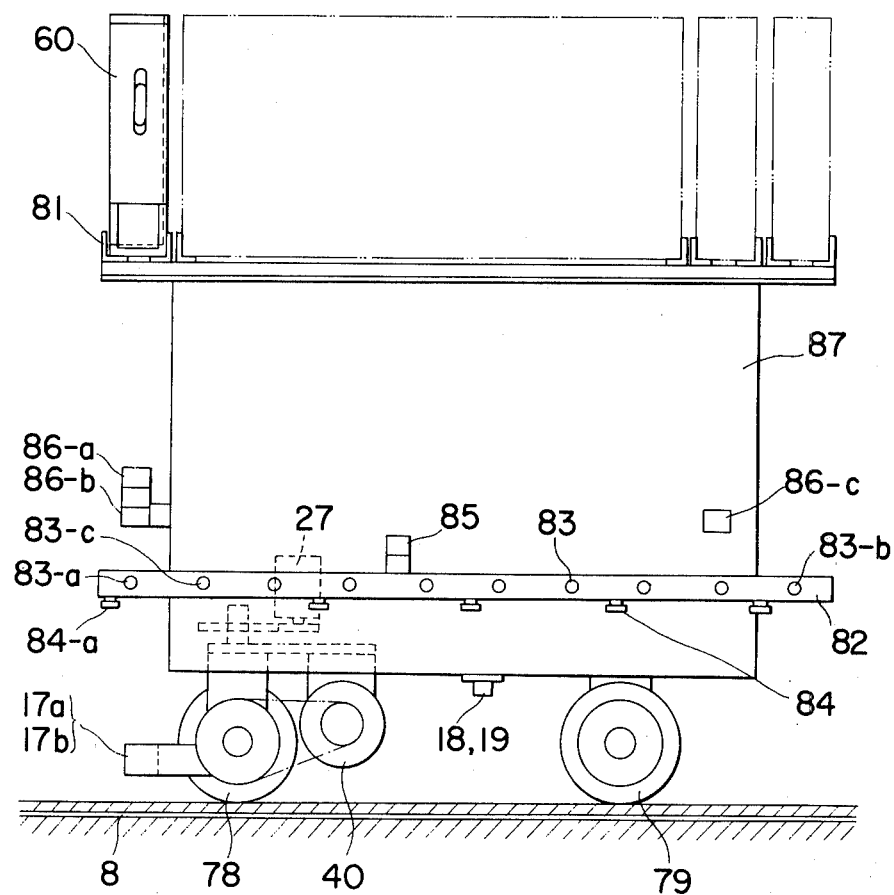
FIG. 4 is a side elevational view of one form of the self-running objects.

One form of the self-running vehicle 3 is shown in FIG. 4. The vehicle 3 as shown in FIG. 4 is a tricycle having one front wheel 78 and two rear wheels 79 driven by the motor 40. The motor 40 is in turn driven by a battery mounted on the vehicle 3.

As mentioned above, the guide line detecting coils 17a and 17b are disposed on the opposite sides of the front wheel 78 so as to detect the magnetic field produced by the guide line 8. When the vehicle 3 is received by the load-unload device 9-1A to 9-1F and 12-1A to 12-1D, the power supply is disconnected and the vehicle 3 is guided along a guide rail 161 of the load-unload device as mentioned later, without performing the self-steering operation of the vehicle 3. An angle member 82 is fixed to a body 87 of the vehicle 3 on the side thereof to face the load-unload device when the vehicle 3 is received by the load-unload device. Feed pins 83 are provided (10 in the present embodiment) one corresponding to each of the trays 80 carried on the vehicle 3, on a side of the angle member 82 at intervals equal to the width of the trays 80 and a roller 84 is provided on the lower side of the angle member 82. The feed pins 83 are adapted to be engaged with a claw 162 of the load-unload device to intermittently feed the vehicle 3 by a distance corresponding to the width of the trays 80. The roller 84 is engaged with the guide rail 161 to guide the vehicle 3 during the feeding of the vehicle 3 by the claw 162. A magnetic flux generator 85, such as a permanent magnet is mounted on the vehicle 3 and adapted to cooperate with detectors 163 and 163a of the load-unload device as mentioned later. The switch means 20 and 21 are denoted in FIG. 4 by 86a and 86c. The vehicle 3 has tray guides 81 on the top portion of the body member 87, which are disposed so as to transfer the trays in a direction normal to the advance direction of the vehicle 3. The tray 80 is a container opened at the top and the front with reference to the feeding direction of the vehicle 3 and adapted to contain cigarettes so as to dispose them along the feeding direction of the vehicle 3.

Figure 6:
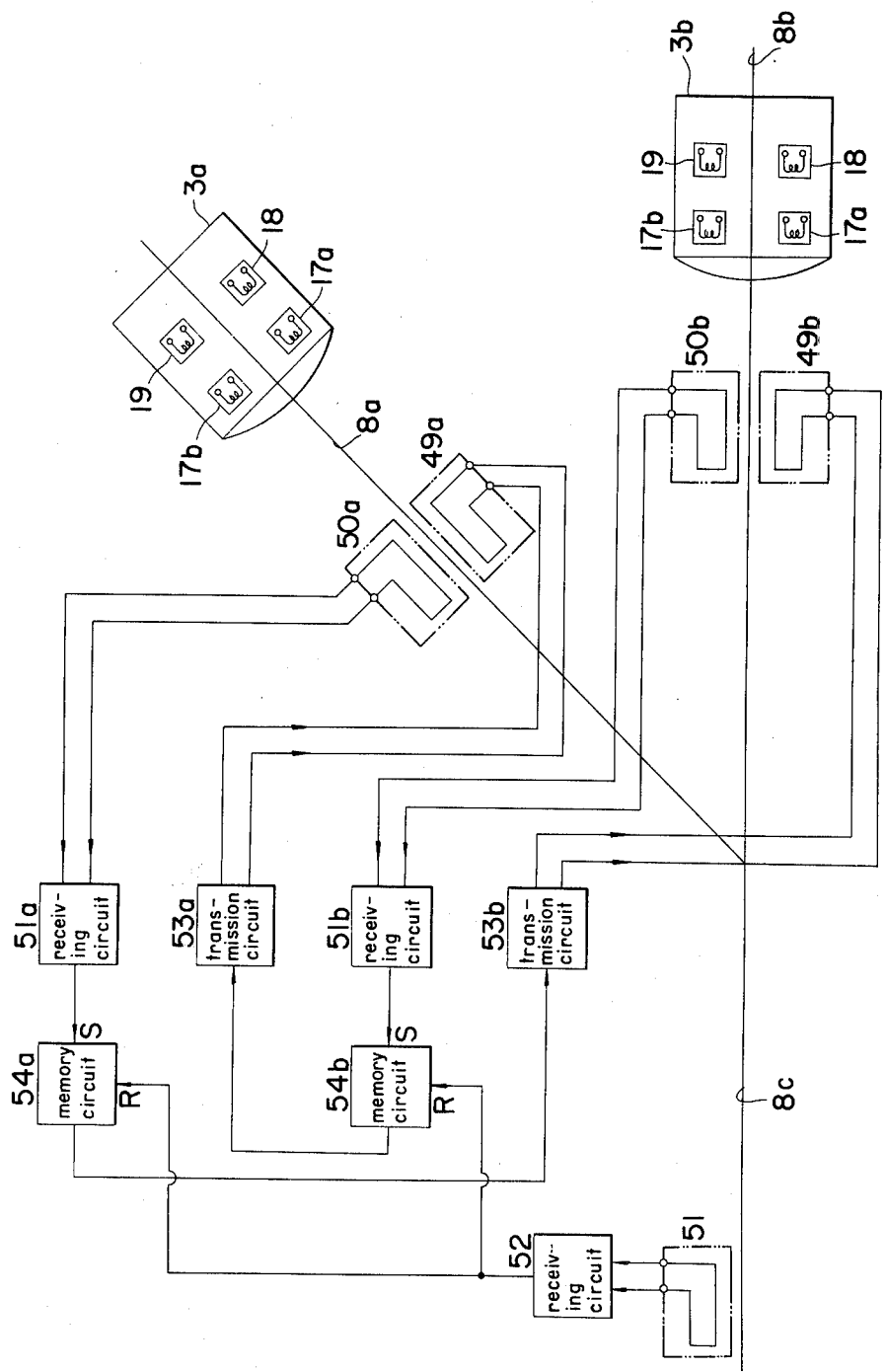
FIG. 6 is a diagrammatic view showing a control system for a meeting point of the self-running objects from different paths.

FIG. 6 shows the cigarette manufacturing zone 1A of the cigarette manufacturing process 1 or the packing zone 2A of the packing process 2, wherein the cigarette manufacturing machine 9A or the packing machine 12A is equipped with the load-unload device 9-1A or 12-1A on its side to face the vehicle 3. The magnetic substance 44 for giving a stop instruction to the vehicle 3 and the transmission coil 43 for giving a start instruction to the vehicle 3 are provided on the load-unload device 9-1A or 12-1A which are adapted to cooperate with the switch means 20 and 21 of the vehicle 3 to generate stop and start signals to the vehicle 3, respectively.

The cigarette manufacturing machine 9A and the packing machine 12A are further adapted to transmit a vehicle requesting signal to central control unit 62 when they are not holding the vehicle 3.

On the floor of the stand-by station 11A or 14A provided in the zone 1A or 2A, ground loops 45 and 46 are laid out. The ground loop 45 is connected to the transmission circuit 47 while the ground loop 46 is connected to the receiving circuit 48. The transmission circuit 47 is adapted to receive the vehicle holding signal from the cigarette manufacturing machine 9A or the packing machine 12A when the vehicle 3 is resting on the working station 10A or 13A, to wit, when the vehicle 3 is undergoing the load-unload work, and the stop signal fx' is transmitted from the ground loop 45. Accordingly, when the vehicle 3 enters the stand-by station 11A or 14A, the receiving coil 18 of the vehicle 3 receives the stop signal to stop the vehicle 3. At the same time, the ground loop 46 detects the arrival of the vehicle 3 and a vehicle arrival siganl or vehicle holding signal is transmitted to the central control unit 62 through the receiving circuit 48.

Figure 5:
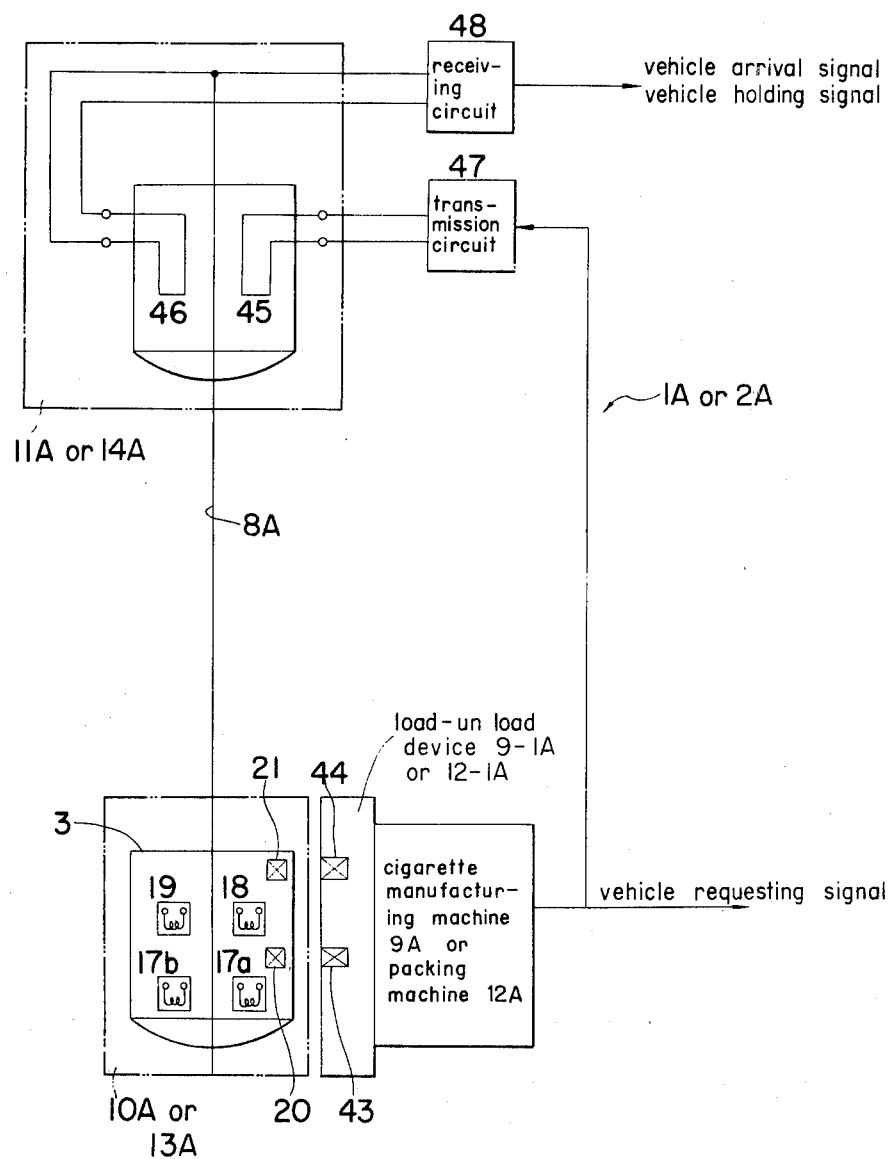
FIG. 5 is a diagrammatic view showing a control system for a working machine and a stand-by or storage station.

Though FIG. 5 is given referring only to the cigarette manufacturing zone 1A and the packing zone 2A, the other cigarette manufacturing zones 1B to 1F and the other packing zone 2B to 2D are formed identically.

FIG. 6 shows one of the intersection control devices 15A to 15C where the guide line 8a meets the guide line 8b and connected to the guide line 8c. In the present embodiment, the same frequencies are applied to the guide lines 8a, 8b and 8c, and transmission ground loops 49a and 49b and receiving ground loops 50a and 50 b are laid out on the floor along the respective guide lines 8a and 8b at positions just before the intersection of the lines 8a and 8b to detect the arrival of the vehicle 3 or to store the vehicle 3 in a standby status, and a resetting ground loop 51 is laid out on the floor at a position after the intersection to give a start instruction to the stand-by position. The ground loops 50a, 50b and 51 are connected to receiving circuits 51a, 51b and 52, respectively, while the ground loops 49a and 49b are connected to transmission circuits 53a and 53b, respectively. The receiving circuit 51a and 51b are in turn connected to memory circuits 54a and 54b to reset them, respectively, and the outputs thereof are connected to the transmission circuits 53b and 53a of the opposite guide lines, respectively. The output of the receiving circuit 52 is connected to the memory circuits 54a and 54b to reset them.

When the vehicle 3a on the guide line 8a enters its stand-by position before the vehicle 3b on the guide line 8b reaches its stand-by position, the ground loop 50a receives a signal from the transmission coil 19 of the vehicle 3a to detect the arrival of the vehicle 3a, setting the memory circuit 54a, and operating the transmission cifcuit 53b of the opposite guide line 8b with the output of the memory circuit 54a to transmit a stop signal from the ground loop 49b.

In this connection, when the vehicle 3b arrives at the stand-by position of the guide line 8b, the receiving coil 18 of the vehicle 3b receives the stop signal and the vehicle 3b is inhibited from going forward and rests in the stand-by position while the vehicle 3a is passing the intersection, avoiding a collision against the vehicle 3a.

When the vehicle 3a has then passed the ground loop 51, the loop 51 receives a signal from the transmission coil 19 of the vehicle 3a and the memory circuit 54a is reset through the receiving circuit 52, so that the signal from the transmission circuit 53b is stopped and the vehicle 3b starts to move.

When the vehicle 3b arrives at its stand-by position prior to the vehicle 3a, an analogous operation can be seen. Furthermore, substantially identical operations are effected at the intersections 15b and 15c.

Figure 7:
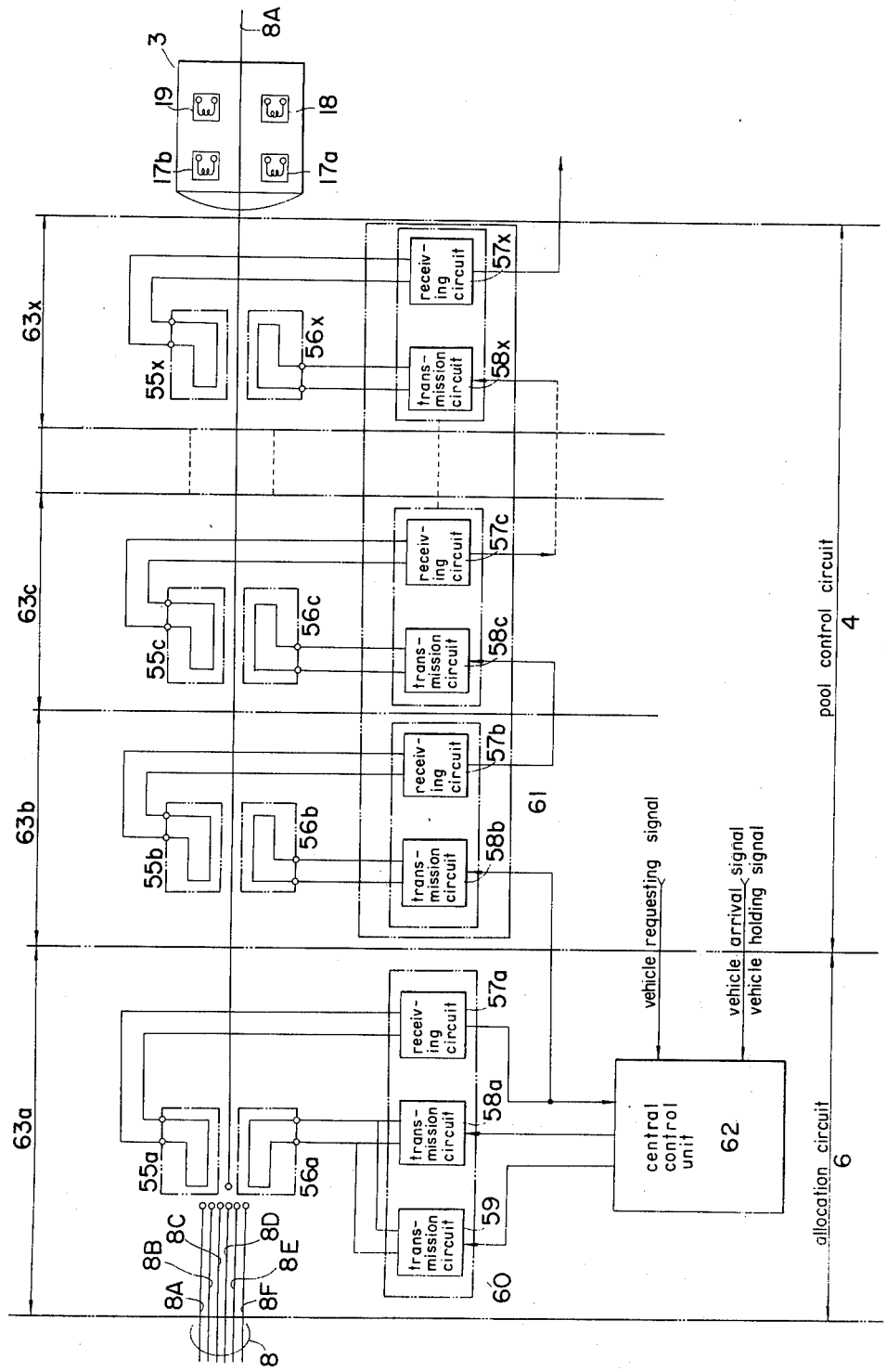
FIG. 7 is a diagrammatic view showing a control system for an reservation zone for the empty self-running objects and an allocation zone.

FIG. 7 shows the reservation zone 4 and the allocation zone 6 for the empty vehicles 3. The reservation zone 4 has vehicle stop positions 63b to 63x for reserving ten to twenty vehicles 3 in this embodiment.

In this connection, it is to be noted that if a stop position 63a of the allocation zone 6 is assumed to be one form of a reservation station, the positions 63a to 63x may be included in the reservation zone.

Through the reservation stations 63a to 63x, the common guide line 8A is laid out and ground loops 55a to 55x and 56a to 56x are also laid out on the floors of the reservation stations 63a to 63x, respectively. The ground loops 55a to 55x are connected to receiving circuits 57a to 57x, respectively and the ground loops 56a to 56x are connected to transmission circuit 58a to 58x, respectively. The ground loop 56a of the reservation station 63a is further connected to a transmission circuit 59.

In this connection, it is to be noted that the signal transmission system between the ground control units and the vehicles is very important to systematically run a plurality of vehicles in a plurality of courses for establishing an effective transportation system as a whole.

The control system of the allocation zone 6 is explained in the following.

The ground loop 53 in the reservation station 63a of the allocation zone 6 is connected to the central control unit 62 through the receiving circuit 57a and further connected to the transmission circuit 58b of the succeeding reservation station, namely, the first reservation station 63b of the reservation zone 4 for the empty vehicle 3. On the other hand, the transmission circuits 58a and 59 of the allocation zone 6 are connected to the central control unit 62 and the outputs thereof are applied to the ground loop 56a. The transmission circuit 58a generates a signal to stop the vehicle 3 and the transmission circuit 59 generates a course direction signal to the vehicle 3.

The central control unit 62 is adapted to receive a vehicle requesting signal from the respective cigarette manufacturing machine 9A to 9F and the respective packing machine 12A to 12F and a vehicle holding signal or a vehicle arrival signal from the stand-by station 11A to 11F and 14A to 14D of the respective zone 1A to 1F and 2A to 2D.

The receiving circuit 58c of the first reservation station 63b of the reservation zone 4 is connected to the transmission circuit 58c of the second reservation station 63c. Similarly, the receiving circuit of every reservation station is connected to the respective transmission circuit of the succeeding reservation station.

Thus, it will be seen that the transmission circuit 58a of the reservation station 63a of the allocation zone 6 transmits a stop signal through the ground loop 56a upon receiving the stop signal from the central control unit 62. The stop signal is transmitted from the central control unit 62 when no vehicle requesting signal has been applied to the central control unit 62.

Now, the operations are explained referring to such a situation, when there are no vehicles 3 reserved in the reservation zone as a matter of convenience.

In this case, no ground loops 56b to 56x of the reservation stations 63b to 63x of the reservation zone 4 are not transmitting signals. When the vehicle 3 enters the reservation zone 4 in this condition, the vehicle 3 does not stop in any station of the reservation zone 4, and passes therethrough until it reaches the reservation station 63a of the allocation zone 6. Then, the receiving coil 18 of the vehicle 3 detects the stop signal from the ground loop 56a to stop the vehicle 3 at the place. At the same time, the ground loop 55a detects the signal from the transmission coil 19 of the vehicle 3 and applies the signal to the control circuit unit 62 through the receiving circuit 57a and to the transmission circuit 58b of the first reservation station 63b of the reservation zone 4 so that it transmits a stop signal through the ground loop 56b.

As a result, the succeeding vehicle 3 is forcibly stopped at the first reservation station 63b, avoiding collision against the vehicle 3 resting on the allocation zone 6. Thus, when the vehicle 3 rests on one of the reservation stations, the succeeding vehicle 3 is stopped at the succeeding reservation station and held there until it receives a start signal or the preceding vehicle 3 starts from the station where it has been held.

In this situation, when a vehicle requesting signal is applied to the central control unit 62 from the machines 9A to 9F and 12A to 12D, the request calls from the machines 9A to 9F and 12A to 12D are memorized in the central control unit 62 in order of arrival of the request calls and the output is applied to the transmission circuit 59 of the allocation zone 6. In other words, a signal of frequency $f_x$ is transmitted from the ground loop 56a so as to select the specific guide line associated with the cigarette manufacturing machine which has first requested the vehicle 3. The vehicle 3 resting on the allocation zone 6 detects the signal of frequency $f_x$ with its receiving coil 18 and the output is applied to the course direction circuit 34 as shown in FIG. 3, determining the course thereby. The output of the course direction circuit 34 is applied as a course direction signal to either of the right and left band-pass filters $23a_1$ to $23a_6$ and $23b_1$ to $23b_6$ so that the guide line detecting coils 17a and 17b can detect the signal of frequency $f_x$. For example, when the machine 9A has transmitted a vehicle requesting signal, the guide line 8A is selected. Stated illustratively, the filter circuits $23a_1$ and $23b_1$ are selected by the course direction circuit 34 because the frequency of the guide line 8A if $f_1$ and the input signal to the transmission circuit 58a of the ground loop 56a is cancelled by the central control unit 62, so that the vehicle 3 starts to move on the guide line 8A according to the signal of frequency $f_1$.

When the vehicle 3 is dispatched from the reservation station 63a of the allocation zone 6, the signal from the receiving circuit 57a is cancelled so that the ground loop 58b of the first reservation station 63b of the reservation zone 4 and the other ground loops 58c to 58x of the succeeding reservation stations 63c to 63x cease transmission of the stop signals.

When the vehicle 3 positioned at the reservation station 63b reaches the reservation station 63a of the allocation zone 6, the vehicle 3 is stopped to stand by there because the stop signal has been being again transmitted from the transmission circuit 58a if no request call has been applied to the central control unit 62.

Thus, vehicles 3 are successively disposed one after another at the allocation zone 6 and when the vehicle 3 at the allocation zone 6 is dispatched therefrom upon receiving instructions from the central control unit 62 including the course direction, the vehicle 3 standing by at the succeeding position of the reservation zone 4 advances to the allocation zone 6 and the vehicles 3 reserved in the reservation zone 4 advance to the respective preceding stations.

The vehicle-request call from the machines 9A to 9F or 12A to 12D is cancelled when the vehicle 3 is dispatched from the allocation zone 6 in response to the instruction from the central control unit 62 according to the request call arrives at the stand-by station 11A to 12F or 14A to 14D associated with the machine 9A to 9F or 12A to 12D which has transmitted the request call.

Figure 8:
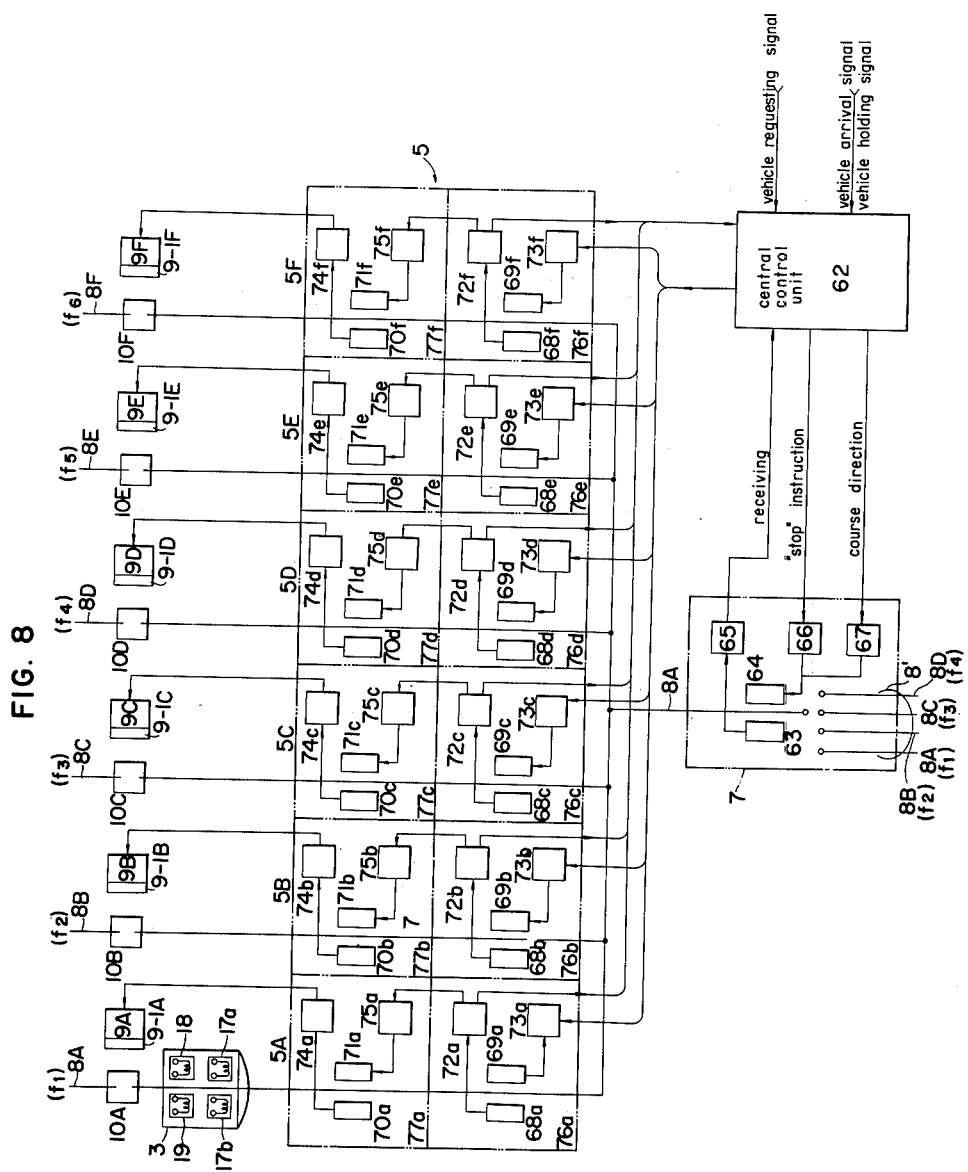
FIG. 8 is a diagrammatic view showing a control system for another reservation zone for the loaded self-running objects and another allocation zone.

Operations in the reservation zone 5 for the loaded vehicles 3 are alike and explained in detail referring to FIG. 8 in association with the allocation zone 7.

The reservation zone 5 includes sub-reservation zones 5A to 5F. In the sub-reservation zones 5A to 5F, reservation stations 76a to 76f and 77a to 77f are provided. The common guide lines 8A is laid out in the respective sub-reservation zones 5A to 5F. Along the guide line 8A, ground loops 68a to 68f, 69a to 69f, 70a to 70f and 71a to 71f ar provided. The ground loops 68a to 68f and 70a to 70f are connected to receiving circuits 72a to 72f and 74a to 74f, respectively, while the ground loops 69a to 69f and 71a to 71f are connected to transmission circuits 73a to 73f and 75a to 75f, respectively.

The sub-reservation zones 5A to 5F are connected to the next station, namely the allocation zone 7.

When the vehicles 3 arrive at the forward reservation stations 76a to 76f of the respective sub-reservation zones 5A to 5F, the outputs of the respective receiving circuits 72a to 72f are applied, through the respective ground loops 72a to 72f, to the central control unit 62 so that the unit 62 memorizes the order of the arrivals and the outputs are also applied to the transmission circuits 75a to 75f of the rear reservation stations 77a to 77f, respectively. The receiving circuits 74a to 74f of the rear reservation stations 77a to 77f are connected to the load-unload devices 9-1A to 9-1F of the cigarette manufacturing machines 9A to 9F.

Transmission circuits 66 and 67 of the allocation zone 7 are connected to the central control unit 62 to transmit a stop signal to the vehicle 3 through the transmission circuit 66 and transmit a course direction signal to the vehicle 3 through the transmission circuit 67.

The control operation in the respective sub-reservation zones 5A to 5F is substantially identical with that of the reservation zone 4.

When the vehicle 3 arrives at the respective forward reservation stations 76a to 76f of the sub-reservation zone 5A to 5F, the output of the respective receiving circuit 72a to 72f is applied to the central control unit 62 through the ground loop 68a to 68f so that the unit 62 memorizes the order of the vehicle arrivals to the stations 76a to 76f. The allocation control system of the allocation zone 7 is substantially identical with that of the allocation zone 7. Though the allocation zone 7 is adapted to successively receive the vehicles 3 one after another, a vehicle requesting signal is immediately transmitted to the central control unit 62 upon starting of the preceding vehicle 3 from the allocation zone 7.

Since the arrival orders of the vehicles 3 are memorized in the central control unit 62 as mentioned before, the transmission circuits 73a to 73f of the forward reservation stations 76a to 76f are selectively operated according to the arrival order. For example, in case the transmission circuit 72a is operated, the output signal is transmitted through the ground loop 69a and detected by the receiving coil 18 of the self-running vehicle 3 resting on the reservation station 76a. Upon detection of the signal, the running control circuit 38 is energized and the running power circuit 39 is operated to start the vehicle 3.

Since the vehicle 3 is set so as to detect the guide line 8A, the vehicle 3 is in a position to run along the guide line 8A. Accordingly, the vehicle 3 starts from the reservation station 76a upon removal of the signal from the central control unit 62 to the transmission circuit 73a.

As soon as the vehicle 3 has started, the signal from the transmission circuit 72 is removed so as to cancel the stop signal to the rear reservation station 77a. Accordingly, the vehicle 3 resting on the reservation station 77a advances to the forward reservation station 76a, where the stop signal is transmitted from the transmission circuit 73a so that the vehicle 3 is stopped there. At the same time, the arrival of the vehicle 3 is memorized by the central control unit 62 through the ground loops 68a and the receiving circuit 72a. On the other hand, the arrival signal is applied to the transmission circuit 75a of the rear reservation station 77a to thereby transmit a stop signal to the vehicle 3 arriving there. In this connection, it is to be noted that the control system between the reservation zone 5, especially, the rear reservation station 77a to 77f and working stations may be analogous. Stated illustratively, even if the load-unload work at the working station has been completed, the vehicle 3 on the respective working station 10A to 10F is inhibited from starting when the corresponding rear reservation station 77a to 77f is occupied by the preceding vehicle 3.

The control system of the allocation zone 7 is substantially identical with that of the allocation zone 6 and the explanation thereof is omitted.

Now, referring again to FIG. 1, the whole operation of the system according to the present invention is explained.

Prior to the start of the operation, the system of the present invention is assumed to be in such a situation that every reservation station 63b to 63x of the reservation zone 4, the allocation zone 6 and every stand-by station 11A to 11F of the respective working zone 1A to 1F are all occupied with the empty vehicle 3. In this situation, when the machine operators assigned to the respective cigarette manufacturing machines 9A to 9F start the operation of the respective machines, vehicle-requesting signals are applied to the respective standby stations 11A to 11F to dispach the respective vehicles 3 resting there to the respective load-unload devices 9-1A to 9-1F. At the same time, vehicle-requesting signals are applied to the central control unit 62 because it is preferably conditioned that the stand-by stations 11A to 11F should constantly hold the vehicles 3.

The vehicle-requesting signals are memorized in the central control unit 62 in order of the input application to the unit 62. According to the order, the unit 62 gives instructions to the vehicle 3 which is standing by at the allocation zone 6 to select one of the guide lines 8A to 8F corresponding to the machine 9A to 9F which has transmitted the vehicle-requesting signal. The vehicle 3, then, sets the band-pass filters $23a_1$ to $23a_6$ and $23b_1$ to $23b_6$ according to the instruction to determine its course and runs along the selected guide line to the indicated stand-by station 11A to 11F. At the same time, the arrival of the vehicle 3 is confirmed through the receiving circuit 48 and the vehicle-requesting signal memorized in the central control unit 62 is cancelled.

The working is thus started at the respective cigarette manufacturing machines 9A to 9F and the vehicles 3 disposed at the respective working stations 10A to 10F are loaded with 10 trays packed with a predetermined amount of cigarettes and dispatched after completion of the loading work from the respective load-unload devices 9-1A to 9-1F to the respective reservation zones 5A to 5F.

Upon dispatch of the vehicles 3 from the respective cigarette manufacturing machines 9A to 9F, the succeeding vehicles 3 which have been reserved at the respective stand-by stations 11A to 11F are immediately supplied to the respective cigarette manufacturing machines 9A to 9F by the requests therefrom. At the same time, vehicle-requesting signals are applied to the central control unit 62 for further supply of the vehicles 3 to the respective stand-by stations 11A to 11F.

It is further assumed that the vehicles 3 each carrying the 10 trays packed with the cigarettes are pooled at the reservation zone 5. These cigarette-loaded vehicles 3 are to be fed to the packing machines 12A to 12D, respectively, to pack every 20 cigarettes into a small package for preparing final products of the cigarette manufacturing factory.

To effect the working at the respective packing machines 12A to 12D, the vehicles 3 loaded with the trays packed with the cigarettes are required to be disposed at the respective packing machines 12A to 12D and the succeeding vehicles 3 are also required to be reserved at the respective stand-by stations 14A to 14D for successive supply of the vehicles 3 to the machines. Accordingly, when there are no vehicles reserved at the respective stand-by stations 14A to 14D, further succeeding vehicles 3 receive course directions through the allocation zone 7 according to the input order of vehicle-requesting signal to the central control unit 62 in a similar manner to the cigarette manufacturing process 1.

Stated illustratively, the vehicles 3 are set so as to detect one of the guide lines 8A to 8D leading to the respective stand-by stations 14A to 14D, determining their respective courses. The vehicles 3, then run to the respective stand-by stations 14A to 14D along the respective guide lines selected. Upon arrival at the respective stand-by stations, the request calls memorized in the central unit 62 are cancelled.

The control operation between the packing machine 12A to 12D and the stand-by stations 14A to 14D is substantially the same as that of the cigarette manufacturing process 1.

When the vehicles 3 allocated to the respective packing machines 12A to 12D have completed unloading operation of the trays packed with cigarettes to the packing machines 12A to 12D and loading operation of empty trays therefrom, the vehicles 3 are automatically moved from the working stations 13A to 13D by the load-unload devices 12-1A to 12-1D, respectively. The vehicles 3, then, move along the common guide lines 8A through the intersection control devices 15A to 15C to the reservation zone 4, where the vehicles 3 are reserved while being controlled by the reservation control means.

Thus, the vehicle 3 is adapted to be fed from the reservation zone 4 to the first process 1 according to the course direction given at the allocation zone 6, work at the first process 1 so as to receive the products of the process 1, be pooled at the reservation zone 5, be fed to the second process 2 through the instruction at the allocation zone 7, work at the second process 2 so as to unload the products, and return to the reservation zone 4, thus establishing a system for the cyclic operation of the vehicle.

Referring now to FIGS. 9 to 15, there is illustrated a recharging apparatus for the self-running vehicle according to the present invention.

Figure 9:
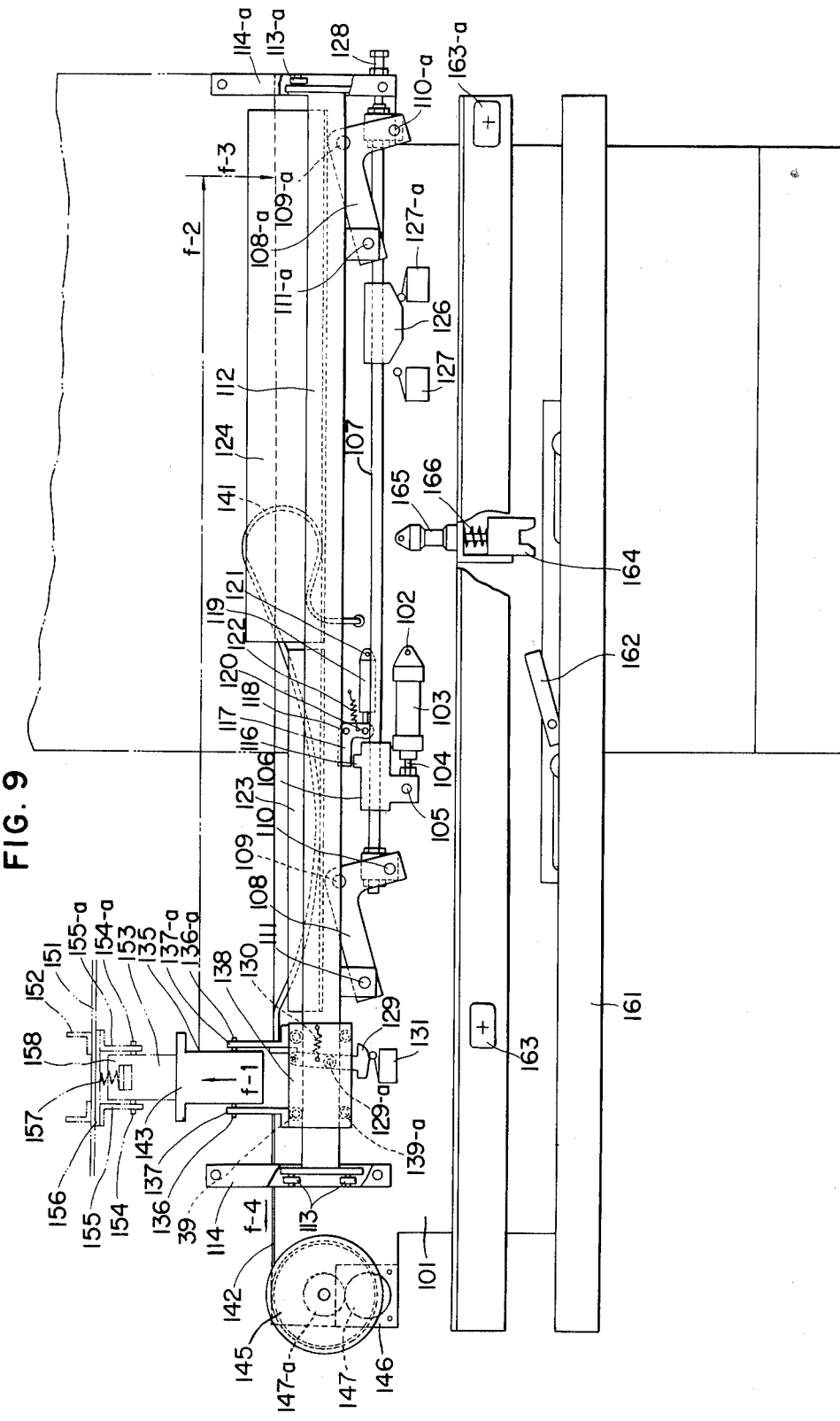
FIG. 9 is a side view, partly broken away, of a recharging apparatus of the present invention.

In FIG. 9 an air cylinder 103 is attached to a frame (or an upright wall) 101 through a pivot 102. A tip end of a piston rod 104 is connected to an arm 106 by means of a pin 105. The arm 106 is fixed to a rod 107. Cross arms 108 and 108-a which are fixed to the frame 101, respectively. Each of said cross arms 108 and 108-a is pivotally connected at its one end to the rod 107 by pivots 110 and 110-a, and at the other end to a rail 112 by pivots 111 and 111-a, respectively. The distance between the pivot 109 and 109-a, the length of the rod 107 between the pivots 110 and 110-a, and the distance between the pivots 111 and 111-a are all equal to one another. Further the length between the pivot 109 and the pivot 110 is equal to that between the pivot 109-a and the pivot 110-a, and the length between the pivot 109 and the pivot 111 is equal to that between the pivot 109-a and the pivot 111-a. Namely, the cross arm 108 is congruent with the cross arm 108-a. Due to such structure, the lateral motion of the rod 107 through the arm 106 is converted to the vertical motion of the rail 112. Guide members 114 and 114-a are fixed to the frame 101 and rollers 113 and 113-a connected to both ends of the rail 112 respectively are guided in said guide members 114 and 114-a, respectively so that the rail 112 may smoothly move in the vertical direction. The length of the rail 112 is determined based upon the distance the vehicle covers while continuing the transporting operation. A stop means 128 is screwed into the guide member 114-a and is adapted to abut against the end of the rail 112.

Figure 11:
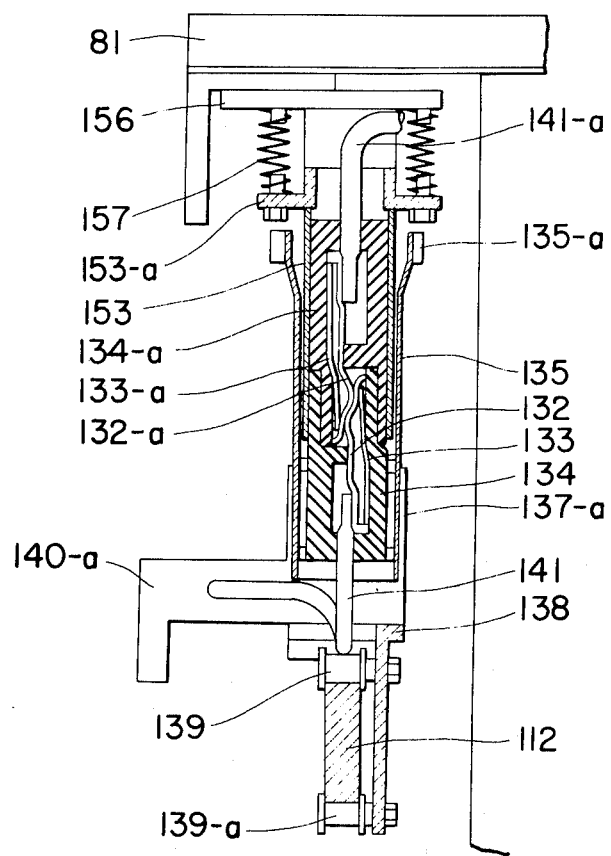
FIG. 11 is a sectional view of a socket means inserted into a plug means.
Figure 12:
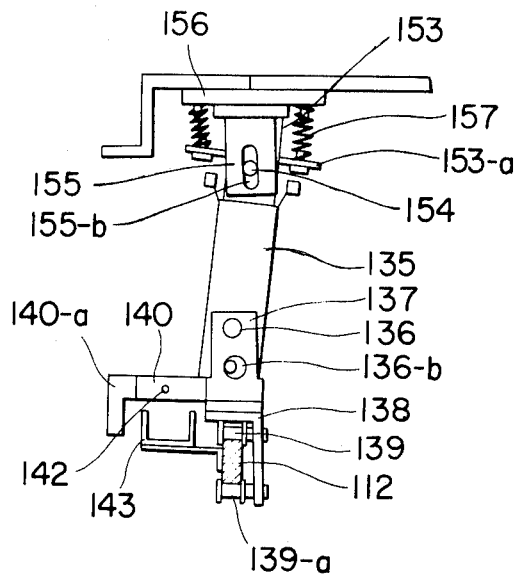
FIG. 12 is an elevation showing another state of connection of a socket means with a plug means.
Figure 13:
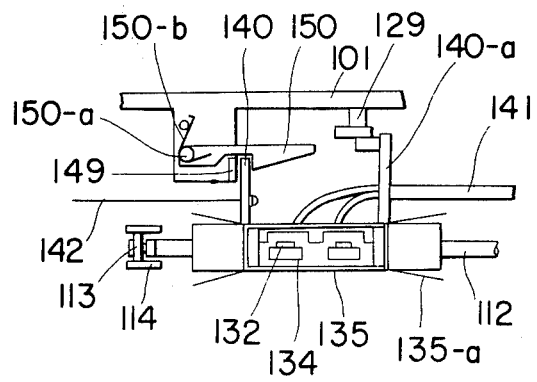
FIG. 13 is a plan view showing how to fix a plug means at a position where a socket means is to be inserted into the plug means.

Referring to FIG. 11, a terminal 132 is fixedly connected to one end of a cord 141 and inserted in a protective case 134 with a leaf spring 133. A plug consists of the terminal 132, the leaf spring 133 and the protective case 134. An outer case 135 has the plug fixed therein, and an upper edge portion 135-a thereof is slightly outwardly opened so that a socket means (which will be explained hereinafter) is easily guided thereinto. Referring to FIG. 11 and FIG. 12 the outer case 135 is supported by support means 137 and 137-a through pins 136 and 136-a which are fixed to said outer case, respectively. A pin 136-b is also fixed to the outer case 135 and inserted into the support means 137-a. The pin 136-b is employed for restricting the swing range of the plug, which may swing on the pins 136 and 136-a, within the range in which the plug is easily and surely connected with the socket means. The size of the space formed in the support means 136-a to receive the pin 136-b is determined so as to correspond to the above limited range.

The support means 137 and 137-a are fixed to a carriage 138 at its both sides, respectively. Said carriage 138 is adapted to slide over the rail 112 by means of two pairs of rollers 139 and 139-a provided at an upper and a lower portion of the carriage as can be seen from FIG. 9. The cord 141 extending from the plug is supported by a hold means 140-a fixed to the support means 137-a, and is adapted to be guided through a guide member 123 attached to the rail 112 and a guide member 124 attached to the frame 101. The cord 141 is fixed at its intermediate portion to the frame 101 at a position corresponding to the substantial center of the rail 112 and the tip end of the cord is connected to a recharging means 173. The length of the cord 141 from the point where the cord is fixed to the hold means 140-a to the point where it is fixed to the frame 101 is made substantially equal to the sum of the half of the distance the plug covers (from a position f-1 to a position f-3) and the length of an arc portion or slack of the cord, which slack is necessary for the cord to turn in the guide members. The length of the guide member 123 corresponds to the distance between the position f-1 and the center of the rail 112, and the length of the guide member 124 corresponds to the distance between the center of the rail and the position f-3. As the plug moves from the position f-1 towards the position f-3, the arc portion of the cord 141 also moves to the right in FIG. 9, and when the plug has passed the center of the rail 112, the cord is guided only by the guide member 124.

A plug means 143 mainly consists of the plug, the support means 137 and 137-a, the outer case 135, the carriage 138 and the cord 141.

A rope 142 is connected at its one end to a hold means 140 holding the plug mean 143 and is connected at the other end thereof to a pulley 145. The length of the rope 142 is substantially equal to the distance between the pulley 145 and the position $f$-3. A motor 146 is adapted to drive the pulley 145 through a reduction gear 146-$a$, a gear 147 and a gear 147-$a$. A clutch 148 is provided between the pulley 145 and the gear 147-$a$.

A terminal 132-$a$ is fixed to one end of a cord 141-$a$ and inserted into a protective case 134-$a$ together with a leaf spring 133-$a$. A socket means 158 consists of the terminal 132-$a$, the leaf spring 133-$a$ and the protective case 134-$a$ and an outer case 153. The protective case 134-$a$ with the terminal 132-$a$ and the leaf spring 133-$a$ is fixedly inserted into the outer case 153 of a size which that it can be inserted into the outer case 135 of the plug means through the upper edge portion 135-$a$. The outer case 153 is supported by pins 154 and 154-$a$ fixed to said outer case 153 and inserted into elongated holes 155-$b$ formed in support means 155 and 155-$a$, respectively. The support means 155 and 155-$a$ are fixed to a holding plate 156, and said holding plate 156 is fixed to one side of the vehicle below a tray guide 152 connected to the working machine. Between said holding plate 156 and a receiving plate 153-$a$ fixed to the outer case 153 there is provided a compression spring 157. The cord 141-$a$ fixed to the socket means 158 is connected to a storage battery 179 installed in the self-running vehicle 151. In FIG. 9, the character $f$-1 shows a position where the plug means 143 is to be pushed up in the direction shown by an arrow ↑ to be connected with the socket means 158. For this purpose, it is necessary to precisely fix the plug means and the socket means at the predetermined positions, respectively. When the plug means 143 has been pulled by the rope 142 from the position $f$-3 towards the direction shown by an arrow $f$-4 along the rail 112 and has returned to the position $f$-1 (a starting positon for recharging), a hold means 140 fixed to the support means 137 is positioned between a stop means 149 and a pawl 150 in a locked relationship whereby the plug means is fixed at the position $f$-1. The pawl 150 is pivotally connected at a pivot 150-$a$ to some support means fixed to the frame 101 and always abuts against the stop means 149 by the action of a spring 150-$b$ (Refer to FIG. 13).

Figure 10:
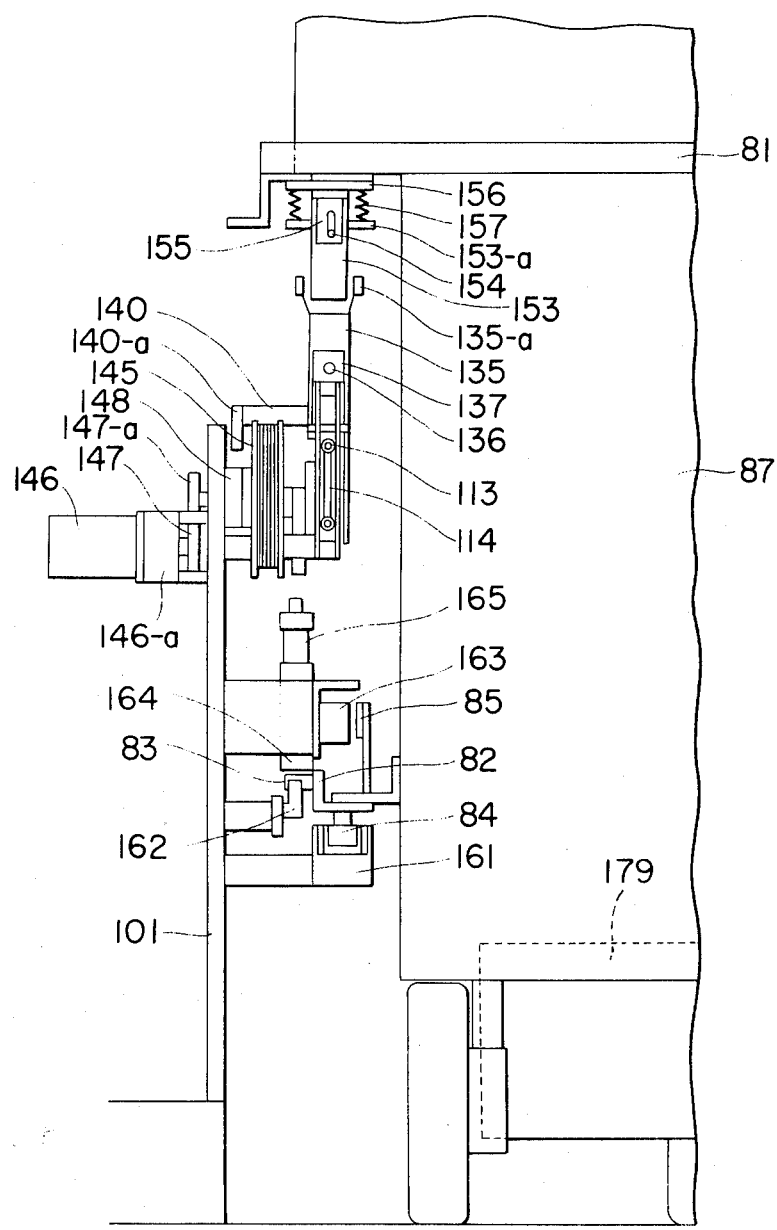
FIG. 10 is an elevational view of a principal part of the invention showing the relationship between a recharging apparatus and a self-running object, taken from the rear side of the object.

Referring to FIG. 10, at a lower portion of one side (facing the frame 101) of the vehicle 151 there is fixed an angle 82 with a roller 84 and a pin 169. A guide rail 161, a pawl 162, a fork 164 and detectors 163 and 163-$a$ are all attached to the frame 101. Just when the roller 84 is inserted into a groove in the guide rail 161, the vehicle is at a right position with relation to the frame 101 and the outer case 135 of the plug means which has been already fixed at the position $f$-1 is positioned right under the outer case 153 of the socket means. As the vehicle advances slowly, the pawl 162 catches the pin 83 to carry the pin 83 towards the fork 164. The fork 164 holds the pin 83 by the action of a compression spring 166 connected to an air cylinder 165. When air is supplied into the air cylinder 165, the fork 164 is pulled up and the engagement between the fork 164 and the pin 83 is released thereby to set the auto-vehicle free. The pawl 162 is helpful only in the forward movement of the vehicle.

The detectors 163 and 163-$a$ are adapted to detect positions of the auto-vehicle and make signals for connection and disconnection of the plug means when a magnetic substance 85 fixed to the one side of the vehicle is just opposite to said detectors, respectively.

Figure 14:
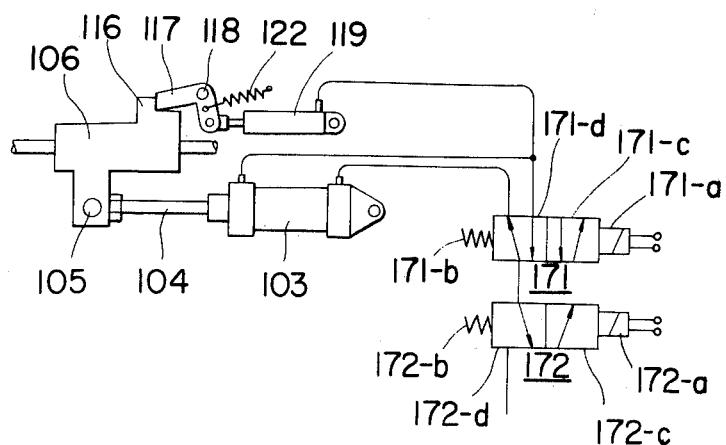
FIG. 14 is a plumbing diagram illustrating the operation of air cylinders.
Figure 15:
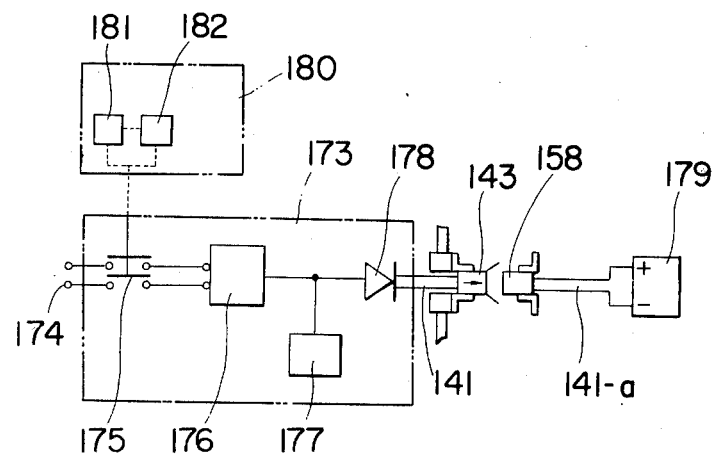
FIG. 15 is a circuit diagram for the recharging.

Referring to FIG. 14, the air cylinder 103 and an air cylinder 119 are actuated by air pressure through valves 171 and 172 operated by solenoids 171-$a$ and 172-$a$, respectively to actuate the piston rod 104 and a pawl 117. When a solenoid 171-$a$ is energized, section 171-$c$ of the valve 171 is connected to hydraulic circuit. When this occurs the piston rod 104 moves to the right in the drawing and the engagement of a cutout portion 116 with the pawl 117 is released. The pawl 117 is adapted to pivot at a pin 118. When the solenoid 171-$a$ is de-energized, the section 171-$d$ of the valve 171 is coupled to the hydraulic circuit by means of a spring 171-$b$. When this occurs, the piston rod 104 moves to the left and, as the air in the air cylinder 119 is exhausted through the valve 171, a tip end of the pawl 117 is lowered and engaged with the cutout portion 116 before the completion of the leftward movement of the piston rod 104. This engagement of the cutout portion 116 with the pawl 117 prevents the arm 6 from moving to the right, to wit, prevents the plug means from slipping off of the socket means. Section 172-$c$ of valve 172 is coupled to the hydraulic circuit when the solenoid 172-$a$ is energized, whereby air is supplied to the valve 171. When the solenoid 172-$a$ is de-energized, section 172-$d$ the valve 172 is coupled to the hydraulic circuit by means of a spring 172-$b$, whereby air is shut out and the air in the air cylinders 103 and 119 is exhausted from the valve 172.

A charging means 173 consists of a transformer 176, a voltage regulator 177, a rectifier 178, a power supply 174 and a switch 175. The recharging means 173 is connected to the terminal 132 of the plug means through the cord 141 and fixed to a proper member of a machine for example, a filter rod manufacturing machine, a packing machine, etc., to which the frame is connected. A voltage suitable for the recharging is obtained through the transformer 176, and the voltage can be varied by the voltage regulator 177 according to the progress of the recharging thereby to obtain a good recharging effect. An alternating current (A.C.) from the power supply 174 is converted into a direct current (D.C.) through the rectifier 178. The switch 175 is adapted to be controlled by timers 181 and 182 which are provided on a control board 180. The timer 181 works for the start of the recharging and is adapted to make the switch 175 close about 2 to 3 seconds after the socket means has been inserted into the plug means. The interval of the above 2 to 3 seconds is necessary, because the height of the socket means is not always constant due to some factors such as the condition of the floor surface the self-running vehicke traveles, the condition of the vehicle itself, etc., and therefore it may take a few seconds for the plug means to be completely inserted into the socket means after a detecting means 127 has begun to work. The timer 182 works for the termination of the recharging and is adapted to open the switch 175 according to the predetermined time which has been set in view of the actual recharging time which is within the period required for the transporting, loading or unloading operation.

The valves 171 and 172 are employed to switch over an air circuit to the air cylinders 103 and 119. When the plug means is disconnected from the socket means (as shown in FIG. 9), the solenoid 171-a and 172-a are both in de-energized states and sections 171-$c$ and 172-$c$ of the valves 171 and 172 respectively are connected is the air circuits. Detecting means 127 and 127-$a$ are adapted to be actuated by a cam 126 fixed to the rod 107, and a detecting means 131 is adapted to be actuated by the hold means 140-a fixed to the support means 137-a through a cam 129 pivotally connected to the frame 101 at a pivot 129-a.

In this embodiment, signals for actuating each means are transmitted through customary circuits. Now there will be explained the operation of the present apparatus. When the plug means and the socket means are fixed at the position f-1 through the mechanism as explained hereinbefore, the detecting means 131 and the detecting means 163 being to work to open the circuit for the solenoid 171-a. The section 171-d of valve 171 is connected to the hydraulic circuit by the action of the spring 171-b thereby to move the piston rod 104 to the left in FIG. 9. As the piston rod 104 moves the left, the rail 112 moves upwards through the cross arms 108 and 108-a. Therefore the plug means 143 also moves upwards so as to be connected with the socket means 158. As shown in FIG. 12, it may sometimes happen that the plug means is out of the plumb relation to the socket means. Accordingly, the plug means can lead somewhat about the pins 136 and 136-a, and the socket means can also lean somewhat about pins 154 and 154-a, thereby enabling the plug means and the socket means to be completely connected with each other. The contact faces of the terminals 132 and 132-a are tightly pressed by means of the leaf springs 133 and 133-a.

When the rail 112 goes upwards the detecting means 127 begins to work to make the circuit for the timer 181. After a predetermined time (about 2 to 3 seconds as explained hereinbefore) the switch 175 of the recharging means 173 is closed through the timer 181 and the storage battery 179 begins to be recharged through the power supply 174. At the same time, the timer 181 works to de-energize the solenoid 172-a. The section 172-d of valve 172 is coupled to the hydraulic circuit by the action of the spring 172-b, thereby letting the air out of the air cylinder 103. As the rail moves downwards and the rod 107 is pushed to the right due to the weight of the rail 112, but is prevented from moving by means of the pawl 117 engaged with the cutout portion 116 of the arm 106. The plug means and the socket means are pressedly connected with each other by the compression spring 157, and therefore the tight connection of the terminal 132 with the terminal 132-a is always kept. In case the floor surface on which the self-running vehicle runs is uneven, if the air is not removed from the air cylinder 103, there is a danger that against the air pressure the socket means may push down the rail 112 with the result that an excessive force may be imposed upon the plug means, the socket means and the link mechanism therefor. Therefore, it is necessary for the air to be let out of the air cylinder 103 in order to make a relief so that the plug means may slide over the socket means to a small degree according to slight jolting of the vehicle caused by unevenness of the floor. Due to the elongated hole 155-b formed in the support means 155, the vertical motion of the vehicle has no influence upon the connection of the plug means with the socket means. During the loading or unloading process, the vehicle with the socket means connected with the plug means moves in the direction sbown by an arrow f-2, and at the final step of the operation the plug means and the socket means are at the position f-3. At this instance, the detector 163-a detects magnetic flux from the magnetic substance 85 fixed to the vehicle. On the other hand, when the timer 182 indicates the predetermined time at which the recharging is to be stopped, the switch 175 is opened to stop recharging the battery 179. At the same time the detecting means 163-a produces a signal to energize the solenoid 172-a. Section 172-c of valve 172 is coupled to the hydraulic circuit and air is supplied into the air cylinder 103. When the last package, etc. has been dealt with, the solenoid 171-a is energized by a signal from a detecting means (not shown) provided on the working machine. Section 171-c of is couple to the hydraulic circuit, and the piston rod 104 moves to the right in FIG. 14. The pawl 171 rises through the action of the air cylinder 119 and the locking between the arm 106 and the pawl 117 is released. At this time, the rail 112 is lowered, to wit, the plug means is disconnected from the socket means. In this connection it should be noted that in another embodiment the recharge may start just when the socket means is connected with the plug means and the recharge may terminate just when the socket means is disconnected from the plug means without employing any timer means.

By adjusting the size of the exhaust port of the air cylinder 103, the lowering speed of the rail 112 can be controlled. Further, by adjusting the stop means 128, atthe extent of the lateral motion of the rod 107, namely the vertical motion of the rail 112 can be controlled. When the rail with plug means is lowered, the detecting means 127-a is actuated through the cam 126 to make a circuit for the motor 146. The pulley 145 is driven by the motor 46 through the reduction gear 146-a and the gears 147 and 147-a to wind the rope thereon, thereby to return the plug means from the position f-3 to f-4 along the rail 112. When the plug means reaches the position f-1, the hold means 140-a actuates the detecting means 131 through the cam 129, while the hold means 140 is engaged with the pawl 150 and the stop means 149. This engagement is to be released when the plug means is connected with the socket means. By means of the detecting means 131 the circuit for the motor 146 is opened to stop the pulley 145.

As fully described above, according to the present invention, the storage battery for the self-running vehicle can be recharged in the course of operation. Thus the vehicle such as a cart, a truck or the like can continue its work, travelling slowly or intermittently by the side of a manufacturing machine, etc. during the recharging operation. Further, sparking between the plug means and the socket means can be eliminated to maintain the recharging effect.

The recharging time may be optionally set with timers etc. in view of the size of the vehicle, the length of the travelling course and the number of vehicles to be employed through a manufacturing process etc. by controlling the stoppage time by the side of the manufacturing machine etc., waiting-time at a reservation zone, etc. Therefore, in the present invention, the storage battery in the self-running vehicle can be effectively recharged without interrupting a series of the manufacturing and transporting process with eliminating the waste of time.

In the foregoing embodiment, the loop guide lines 8A to 8F are connected to the oscillators 16A to 16F and the different frequencies f1 to f6 are assigned to the lines 8A to 8F, respectively, to generate different magnetic field patterns in either of the cigarette manufacturing process 1 or the packing process 2 as shown in FIG. 2. In this connection, it is to be noted that the oscillators 16a to 16F are not necessarily required to oscillate at different frequencies to specify the courses for the vehicles 3 in relation with the guide lines 8A to 8F. Stated illustratively, the layout of the guide lines 8A to 8F as shown in FIG. 2, the oscillators 16A to 16F may be adapted to oscillate the same frequency, for example, $f1$. Accordingly, all the guide lines 8A and 8D generate the same pattern of magnetic field. It is further to be noted that the six oscillator is not always necessary and that one oscillator connected to the guide lines 8A to 8F can afford to attain the purpose to produce the same magnetic field for the respective guide lines 8A and 8F. Furthermore, the present embodimen is applicable not only to the cigarette manufacturing process 1 but also to the packing process 2.

In the present embodiment, additional ground equipment is provided before and after the forks where the collective guide line 8 branches off to the loop guide lines 8A to 8F, to detect the arrival and passing over of the vehicle 3. The ground equipment is electrically connected to the central control unit 62 and adapted to control so that two or more guide lines may not be concurrently energized when the vehicle 3 is passing through the forks. The vehicle 3 approaching the forks is detected and the detection signal is applied to the central control unit 62 so that the guide lines other than the specific line memorized and selected by the control unit 62 are deenergized. Thus, the vehicle 3 can run continuously by detecting the magnetic field generated from the specific guide line. In this case, the ground equipment is each formed of a transmission coil and a receiving coil, for example, such a transmission coil and a receiving coil as denoted by 50 and 51 in FIG. 6. These coils are connected to the control unit 62. In the thus constructed vehicle allocation system, such bandpass filters $23a_1$ to $23a_6$ and $23b_1$ amd $23b_6$ as shown in FIG. 3 may be omitted.

The first embodiment is advantageous in case a considerably great number of working machines of the same kind are arranged in parallel with one another, while the second embodiment may be advantageously employable in case the number of the working machines is relatively small.

As mentioned above, according to the present invention, the vehicles are fed from the first reservation zone one after another, selecting one of the guide lines laid out in parallel with one another, to one of the working zones of the first process according to the instruction from the central control unit, pooled at the second reservation zone after completion of working operation of the first process, further fed, in sequence of the arrival at the second reservation zone, to one of the working zones of the second process according to the instruction from the central control unit, and returned to the first reservation zone after operations in further processes, if necessary, thereby to provide an effective and economical system for the cyclic operation of the vehicle. According to one mode of the allocation system, different signals are assigned to the respective guide lines to positively specify the guide lines when a considerably large number of working machines are employed and according to another mode of the system, one kind of signal is sufficient to feed the vehicle to the working zones when the number of the machines employed is relatively small. Further according to the present invention, a stand-by station is advantageously provided in each of the working zones at a position just before the working station, thereby to immediately supply the vehicle to the working station upon request from the working machine. The provision of these stand-by stations can solve the problem of possible delay in vehicle feeding to the respective working machine, which is somewhat inherent to a machine layout having a considerable number of machines arranged in parallel with one another, because a machine positioned at an outer position is remote from the allocation zone. Furthermore, the stand-by stations are adapted to be supplied with vehicles successively upon departure of the preceding vehicles from the respective stations, so that the while cyclic operation of the vehicles can be effectively and surely carried out with a simple control system.

The system of the present invention is applicable not only to the cigarette manufacturing process but also to another manufacturing process, such as food, electrical appliance or automobile manufacturing process, or to a distribution system for a warehouse etc. with the same advantages as of the cigarette manufacturing process.

What is claimed is:

1. A method for the cyclic operation of self-running objects in a circular network of guide means including at least two working stages, each working stage having a plurality of working zones, the individual working zones of one stage differing in working capacities from the respective working zones of the succeeding stage, said method comprising the steps of feeding the self-running objects one after another along the guide means to the working zones of the first stage upon requests for the objects from the first stage working zones; effecting first working operations in association with the objects fed to the respective first working zones; pooling the objects after completion of the first working operations at the first stage working zones, feeding the objects pooled, one after another, along the guide means to the working zones of the second stage in response to requests for the objects from the second stage working zones; effecting second working operations in association with the objects fed to the second stage working zones; and pooling the objects after completion of the second working operation at the second stage working zones for further feeding of the objects to the working zones of the first stage.

2. A method for the cyclic operation of self-running objects as set forth in claim 1, wherein said guide means comprises common guide lines provided between the pooling of the objects and the feeding of the objects in the first stage and between the pooling of the objects and the feeding of the objects in the succeeding stage; and branch guide lines branched from the common guide lines between the feeding of the objects and the pooling of the objects throughout the respective working zones in the first stage and between the feeding of the objects and the pooling of the objects throughout the respective working zones in the succeeding process.

3. A method for the cyclic operation of self-running objects as set forth in claim 1, which further comprises additional pooling of the objects between the feeding of the objects and the effecting of the first or second working operations.

4. A method for the cyclic operation of self-running objects as set forth in claim 3, wherein said additional pooling is provided immediately prior to the first or second working operations.

5. A method for the cyclic operation of self-running objects as set forth in claim 1, wherein said feeding of the objects is effected upon requests from the working zones in sequence of the transmission of the requests from the working zones.

6. A method for the cyclic operation of self-running objects as set forth in claim 3, wherein the objects additionally pooled are fed to the working zones in response to requests from the working zones.

7. A method for the cyclic operation of self-running objects as set forth in claim 1, wherein the objects pooled are fed to succeeding working stages in the sequence of the pooling.

8. A method for the cyclic operation of self-running objects as set forth in claim 1, which further comprises recharging the driving power of the self-running objects.

9. A method for the cyclic operation of self-running objects as set forth in claim 1, which further comprises determining a priority for the objects from different working zones when the objects meet in the course of the cyclic operation thereof.

10. A system for cyclicly operating a plurality of self-running objects said system comprising:
   a. a first reservation means for receiving empty ones of said self-running objects;
   b. a first working stage including a plurality of first working units for receiving empty self-running objects and for loading said self-running objects with a product produced by said working units;
   c. a second reservation means having a plurality of reservation stations corresponding to said working units for receiving said self-running objects with said products thereon from said first working stage;
   d. a second working stage including a plurality of second working units for receiving said self-running objects with the products thereon, performing a second operation on said products and returning said products to said self-running objects;
   e. central control means; and
   f. guide means interconnecting said first reservation means, said first working stage, said second reservation means, and said second working stage for guiding the movement of said self-running objects and for carrying control signal between said central control means and said self-running objects, wherein said guide means comprises a first common guide line extending from said first reservation zone towards said first working stage, a first plurality of guide lines branching from said first common guide line each of said guide lines passing through a first working stage and a second reservation stage, a second common guide line interconnecting said first plurality of guide lines to a second plurality of guide lines each of said second plurality of guide lines passing through one of said second work stages, and a third common guide line coupled between all of said second plurality of guide lines and said first reservation means, wherein said guide means forms a continuous loop for guiding said self-running objects.

* * * * *